March 18, 1952  L. F. R. FELL  2,589,788
INTERNAL-COMBUSTION ENGINE POWER PLANT
Filed Dec. 26, 1947  5 Sheets-Sheet 2
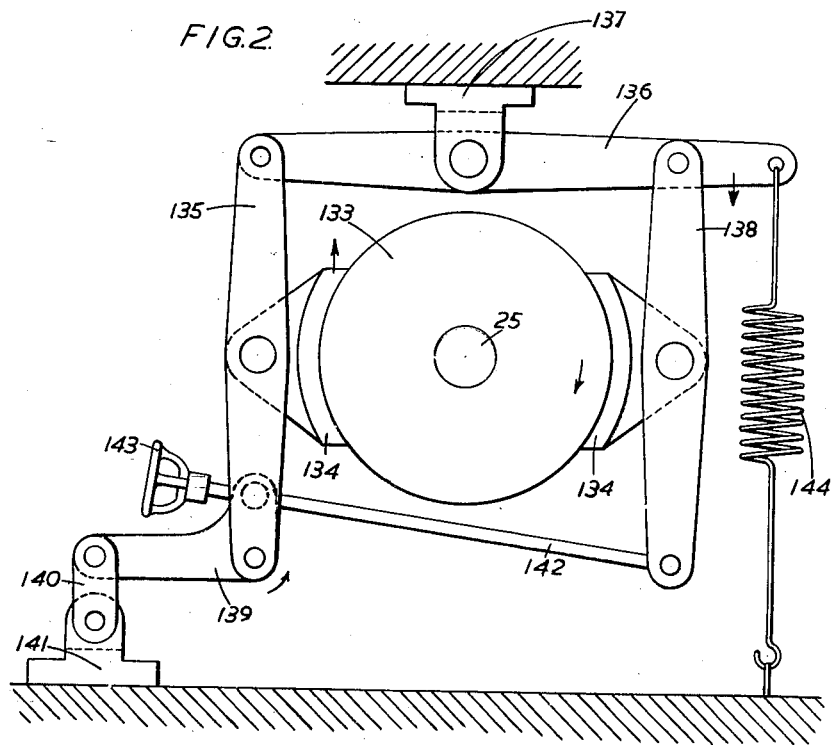
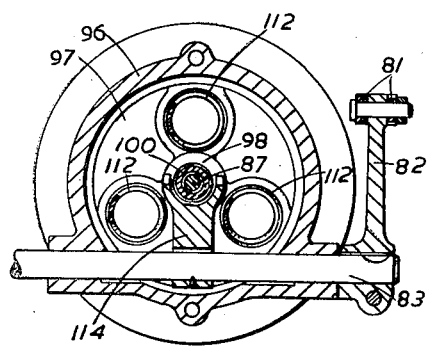
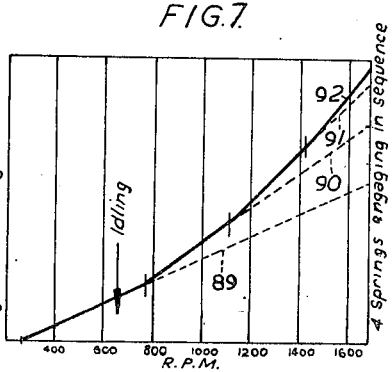
Inventor
Louis F. R. Fell
By
Emery, Holcombe & Blair
Attorneys

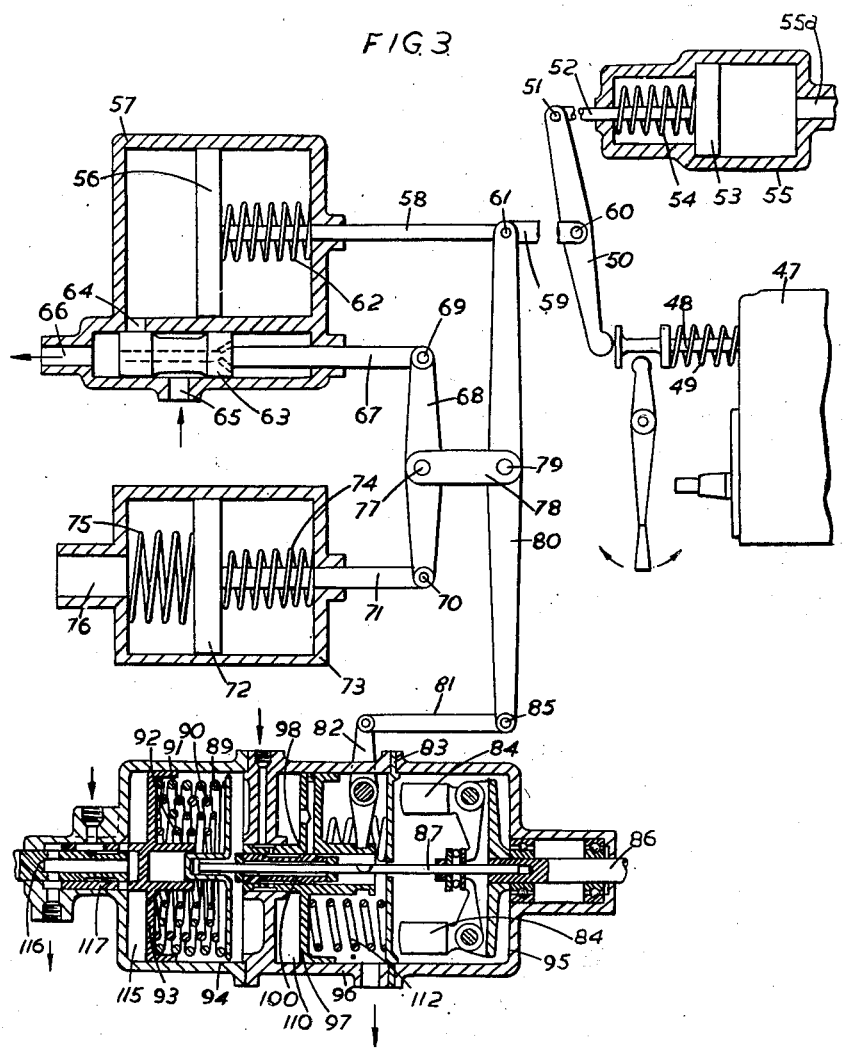

March 18, 1952 L. F. R. FELL 2,589,788
INTERNAL-COMBUSTION ENGINE POWER PLANT
Filed Dec. 26, 1947 5 Sheets-Sheet 4

Inventor
Louis F. R. Fell
By
Emery, Holcombe & Blair
Attorneys

March 18, 1952 — L. F. R. FELL — 2,589,788
INTERNAL-COMBUSTION ENGINE POWER PLANT
Filed Dec. 26, 1947 — 5 Sheets-Sheet 5

Inventor
Louis F. R. Fell
By
Emery, Holcombe & Blair
Attorneys

Patented Mar. 18, 1952

2,589,788

UNITED STATES PATENT OFFICE 2,589,788

INTERNAL-COMBUSTION ENGINE POWER PLANT

Louis Frederick Rudston Fell, Littleover, England, assignor to Fell Developments Limited, London, England, a British company Application December 26, 1947, Serial No. 793,903
In Great Britain October 13, 1947

15 Claims. (Cl. 60—97)

This present invention relates to an internal combustion engine power plant embodying two or more engines of the compression ignition type, these engines being supercharged at a pressure which decreases as their rotational speed increases, by an independently driven compressor or compressors.

In a multiple engine power plant it is desirable that the total load on the plant shall be shared as equally as possible between the several engines in operation at any one time irrespective of the running speed. In the interests of flexibility of the plant it is desirable that it shall be possible to run on load any one or any combination of the engines comprised in the plant. For certain uses such as for example self-propelled vehicles, it is of importance that the engines be caused to contribute successively their individual torques to the total torque smoothly and in any desired order and with no discontinuity in the final output torque of the plant, while putting individual engines on load or while taking them off load, and also to be able to disconnect completely any or all of the engines.

The object of the present invention is to provide a power plant which shall fulfil these requirements the improved plant comprising one or more units in each of which are two engines.

According to this invention a power unit comprises in combination two main internal combustion engines operating with compression ignition, means including one or more compressors driven independently of the main engines for supercharging those engines at a pressure which decreases as the rotational speed of each main engine increases, separate governors respectively controlling the fuel injection pump of each main engine, means for varying the speed setting of each governor, a differential gear, means whereby each main engine drives a sun wheel of this gear through a variable filling fluid coupling, means for transmitting power from the planet-carrying member of the said gear to the mechanism to be driven by the power unit, and a unidirectional brake device operative on each sun wheel of the said gear, the whole unit construction when in operation enabling the torques of one or both of the main engines to be transmitted in succession or in combination to the mechanism which is driven thereby and in a way which avoids sharp fluctuations or discontinuity in the final output torque. The variable fluid coupling used is conveniently of the scoop-tube type.

Preferably each compressor is driven by an internal combustion engine operating with compression ignition and this engine has a governor with means for varying the speed setting thereof, the governor controlling the delivery of the fuel injection pump to the engine.

Each governor whether it is for a main engine or for an auxiliary engine driving a compressor, is of the centrifugal type and the variation in its speed setting is effected by movement of the abutment of one or more springs which control the operation of the governor. In the case of the governor of each auxiliary engine the movement of the spring abutment is actuated or controlled by means responsive to the boost pressure of the main engines. Servomotors actuated by liquid pressure are employed on the one hand to transmit to the spring abutment the movement which effects the speed setting of the governor, and on the other hand to transmit from each governor the movement which effects the speed regulation of the engine with which the governor is associated.

Each unidirectional brake device is conveniently of the self-wrapping type which will grip automatically and hold stationary a brake drum when this tends to rotate in one direction but will automatically release the brake drum when it is rotated in the opposite direction.

In the transmission of power from two of the foregoing units the planet-carrying member of the differential gear of each power unit may be rotationally connected to the sun wheel of a separate differential gear whose planet-carrying member is rotationally connected to the mechanism which is to be driven by the power plant.

There is combined with each main engine an automatic control system comprising means whereby the amount of fuel delivered by the fuel injection pump of the main engine is varied in accordance with the speed of the engine and also in accordance with the boost pressure of the engine.

Each engine is controlled by hydraulic means and the liquid under pressure employed in the hydraulic control is conveniently obtained from the lubricating oil pressure system of the engine, means being provided whereby if the pressure in this system falls below a predetermined figure the automatic control for setting the fuel injection pump delivery will be overridden automatically and the delivery of the fuel by the pump will be cut off.

The improved power plant in one form in which it may be carried out in practice is illustrated in the accompanying drawings. In these drawings:

Figure 2 is a diagrammatic representation of a unidirectional braking device such as may be used to prevent backward or negative rotation of a sun wheel in a differential gear.

Figure 3 is a diagrammatic layout of the control devices for each main engine in the power plant.

Figure 6 is a section on the line VI—VI in Figure 5.

Figure 7 is a diagram showing the approximate speed ranges covered by the combination of the four governor springs which come into operation in sequence.

Figure 1:
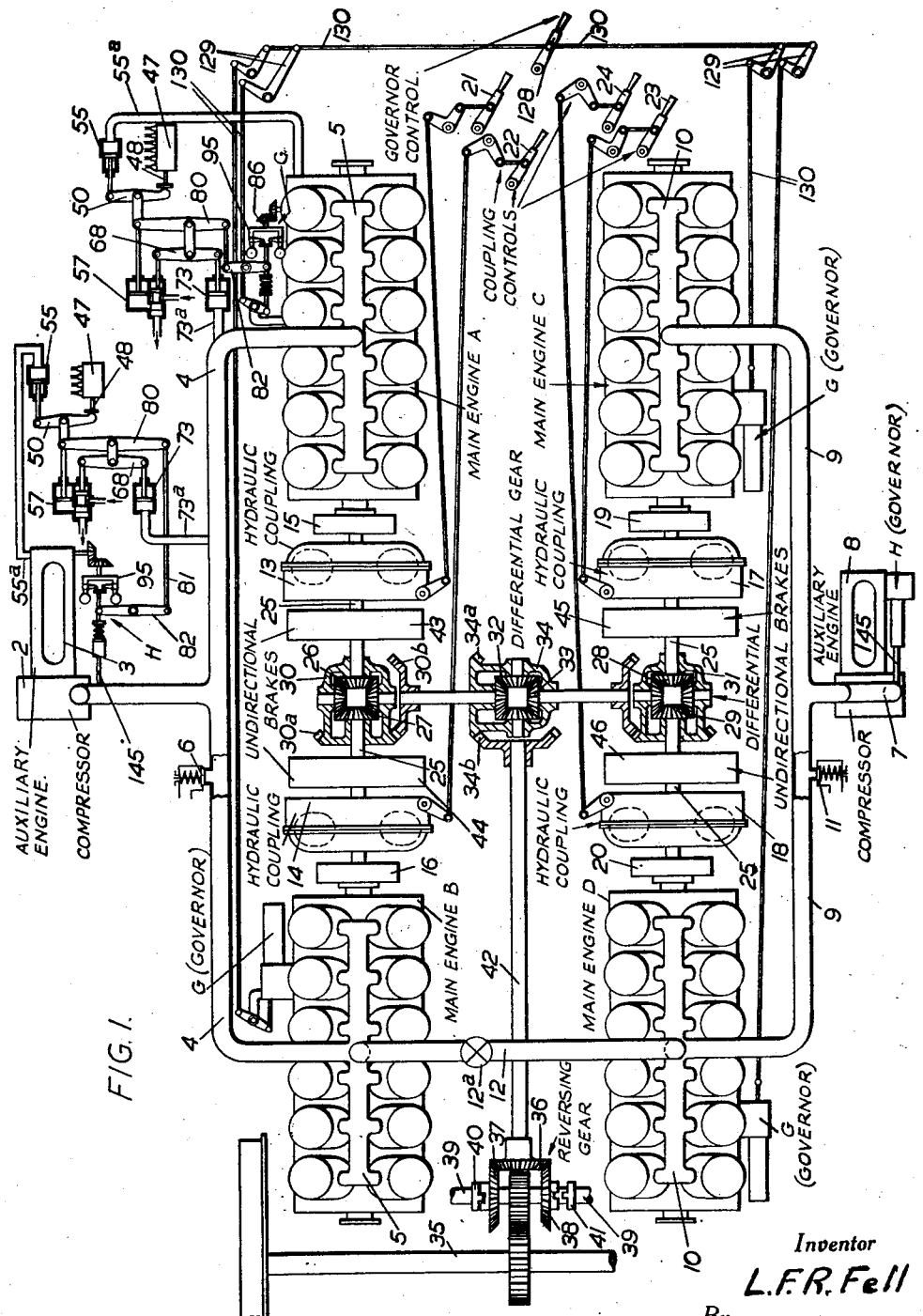
Figure 1 shows diagrammatically a power plant according to the present invention as adapted to the propulsion of a railway locomotive, the main engines being supercharged by compressors independently driven.

In carrying the present invention into effect as shown in Figure 1, and by way of example in a two unit form suitable for a self propelled vehicle such as a railway locomotive, there are four internal combustion engines A, B, C and D operating with compression ignition. These engines may conveniently be of the V type and each may comprise twelve cylinders.

Engines A and B constitute one power unit while engines C and D form the second unit.

The engines A and B are supplied with air by a compressor 2 driven by an auxiliary engine 3 which is preferably of the compression ignition type. The compressor 2 delivers air through a pipe 4 to the manifolds 5 of the engines A and B. A spring loaded relief valve 6 is provided on the pipe 4 and this valve may have means to enable it to be manually opened when required.

Similarly engines C and D are supercharged by a compressor 7 driven by an auxiliary engine 8 and delivering air by a pipe 9 to the manifolds 10. A spring loaded relief valve 11, similar to the valve 6, is provided on the pipe 9. A balancing pipe 12 is provided to connect the pipes 4 and 9 and this pipe 12 may be provided with a valve 12a to enable the pipes 4 and 9 to be isolated from one another.

The crankshafts of the engines A and B are coupled to the input elements of variable filling fluid couplings 13 and 14. Torsional oscillation damping devices 15 and 16 may be provided between the engines and the fluid couplings. Similarly fluid couplings 17 and 18 and damping devices 19 and 20 are provided for engines C and D.

The variable filling fluid couplings are of the scoop-controlled type, actuation of the scoops being controlled by levers 21, 22, 23 and 24 through suitable linkages.

Shafts 25 are in each case directly coupled at one end to the output element of their respective fluid couplings and at their other ends to sun wheels 26, 27, 28 and 29 of two differential gears. The planet carrying members 30, 31 of these gears are connected through appropriate gearing 30a, 30b to the sun wheels 32 and 33 of a third differential gear. The planet carrying member 34 of the third differential is connected by suitable gearing 34a, 34b with a driving axle 35 of the vehicle. A gear train connects the planet carrying member 34 and the axle 35 and may conveniently include a reversing gear which is shown diagrammatically as a pinion 36 permanently meshed with two crown wheels 37 and 38 mounted freely on a shaft 39 and adapted to be alternatively connected to the shaft 39 by dog clutches 40 and 41.

It will be understood that when a two unit four engine plant is applied to a purpose other than propelling a vehicle final drive shaft 42 is connected to the appropriate part of the machine to which power is to be supplied.

In order to enable the torque of one of the engines of a plant to be transmitted to the final drive shaft 42 when the fluid couplings of the other engines of the plant are empty and consequently are incapable of offering resistance to rotation of their respective sun wheels, means are provided to hold these sun wheels against backward rotation. These means may take the form of unidirectional brakes 43, 44, 45 and 46 such as for example self-wrapping brakes which will automatically grip and hold stationary their associated brake drums when these drums tend to rotate in a backward direction but which automatically allow the drums to rotate freely in a forward direction.

Figure 2 is a diagrammatic illustration of a unidirectional braking device in which 133 is a brake drum mounted on a shaft 25. Brake shoes 134 are pivoted on links 135 and 138. The links 135 and 138 are suspended from a rocking beam 136 pivoted on a support 137. The link 135 carries a bell crank lever 139 pivoted to its lower end. One end of the lever 139 is connected by a link 140 to an anchorage 141. The other arm of the bell crank lever 139 is connected by a rod 142 pin jointed on the link 138 at one end and provided with a screw thread at its other end. An adjusting hand wheel 143 is screwed on to the rod 142 and bears against the short arm of the bell crank. A spring 144 tends to tip the lever 136 in a clockwise direction. If the drum 133 moves in a clockwise direction the shoe 134 carried by the link 135 tends to lift the left hand end of the beam 136 at the same time that the spring 144 is tending to depress the right hand end of the beam 136. Any movement of the link 135 upward tends to tip the bell crank in an anticlockwise direction putting a pull on rod 142 and thus causing the shoes 134 to grip the drum 133. Obviously any rotation of the drum 133 in an anti-clockwise direction will release the shoes from the drum.

In a power plant embodying a number of engines it is desirable to provide safeguards to protect the engines against damage in certain circumstances. For example, should the lubricating oil pressure fall below a predetermined value it is desirable that that particular engine should automatically be shut down. Similarly should the supercharge air pressure to a particular engine fall below a value corresponding to the quantity of fuel being supplied to that engine it is desirable that the amount of fuel should be appropriately reduced.

For the purpose of controlling the torque developed by the individual engines and maintaining the speed of the engines at the desired value, the engines are each provided with a centrifugal type variable speed governor. In the preferred form of governor the variation in speed setting is obtained by moving the abutment of the governor spring or springs. In order to cover a wide range of speed and to obtain the desired governor characteristic it may be desirable to employ a number of springs, say four, which engage the governor plunger in sequence so that as each additional spring engages it adds its load to that of the spring or springs already engaged.

Figure 3 is a diagrammatic layout of controls to be mounted on each main engine. The layout of controls is also shown in a simplified manner in Figure 1 for the engine A, it being understood that similar mechanisms are provided for the engines B, C and D. For the purpose of avoiding unnecessary complexity of the drawing, however, these mechanisms are omitted from the engines B, C and D in Figure 1. It will be understood that each engine is provided with its owen fuel injection pump 47 and that for any given set of conditions the torque produced by the engine will be determined by the amount of fuel which the pump is permitted to supply to the engine. A rod 48 when moved towards the right will cause the injected fuel quantity to increase and vice versa. A spring 49 tends to move the rod 48 to the left, i.e. towards "stop" or no fuel position. The end of the rod 48 is engaged by the end of one arm of a lever 50 the end 51 of the other arm of which is pivoted to the end of a rod 52 of a piston 53 movable in opposition to a spring 54. The piston 53 slides in a cylinder 55 wherein it is subjected through a pipe to the lubricating oil pressure of the engine. So long as the engine is running and the oil pressure is maintained above a predetermined value the piston 53 will be pressed hard against the end of the cylinder 55 as shown. In this condition the point 51 may be considered as a fixed pivoting point for the whole lever 50. On the other hand should the oil pressure fall below a certain predetermined value the piston 53 will move to the right and the rod 48 will move to the "stop" position thus shutting the engine down, the lever 50 then turning about the pivot 60 in its length.

In all normal circumstances the movement of the rod 48 is effected by the movement of servomotor piston 56 in a cylinder 57. A rod 58 extending from the piston 56 is connected to the lever 50 by a link 59 which extends from the pivot 60 on the lever 50 to the pivot 61 at the end of the piston rod 58. The piston 56 is urged to the left by a spring 62 tending to shut down the engine. The admission and release of liquid to and from the cylinder 57 are controlled by a piston valve 63 which cooperates with a port 64 in the wall of the cylinder 57. Sufficient movement of the valve 63 to the right as shown in Figure 3 releases liquid from the cylinder and sufficient movement of the valve to the left admits liquid to the cylinder. In an intermediate position the valve 63 obstructs the port 64 and thus locks up the liquid in the cylinder 57. A port 65 in the wall of the cylinder in which moves the valve 63 is connected to a supply of liquid under pressure and a port 66 at the end of this cylinder is connected with a liquid storage vessel.

In some cases the liquid may be the lubricating oil of the engine. The valve 63 has a rod 67 to the end of which is pivoted one end of a floating lever 68 by a pin joint 69. The opposite end of the lever 68 is pivoted at 70 to a rod 71 of a piston 72 of a servomotor the piston being movable in a cylinder 73. The piston 72 is loaded on one side by a spring 74 and on the other side by an opposing lighter rated spring 75. A port 76 at the end of the cylinder 73 is connected by a suitable pipe 73a with the air supply pipe 4 of the engine. Increase in boost pressure will tend to move the piston 72 to right and vice versa.

A point 77 in the floating lever 68 intermediate between the ends 69 and 70 is connected by pivots and a link 78 with a point 79 in the length of a floating lever 80. At one end the lever 80 is pivoted at 61 to the piston rod 58 and the opposite end is pivoted at 85 to a link 81 which in turn is connected to the end of a lever 82 on a rock shaft 83. The angular position of the rock shaft 83 and consequently of the lever 82 is dependent on the attitude or relative position of governor weights 84 at any instant. A rise in engine speed tends to move the weights 84 outwards and swing the lever 82 clockwise thus moving the pin joint 85 to the right as shown in Figure 3. Leaving the detailed description of the governor until later the functioning of the devices just described is as follows. Assuming the engine to be running under steady conditions then the piston 53 will be held to the left against its stop and the pivot at the point 51 may be regarded as fixed in space. Should the load on the engine increase then the engine speed will tend to fall and the weights 84 to come inwards thus moving the arm 82 counterclockwise. Through the link 81 the point 85 will be moved to the left and so also will be moved the points 79 and 69 and consequently the valve 63. Thereupon liquid under pressure will be admitted to the cylinder 57 moving the piston 56 to the right thus swinging the lever 50 about the pivot at the point 51 and moving the rod 48 to the right to give more fuel to the engine to increase its torque and thus balance the increase in load and restore the speed to its intended value. It will be realised that as the piston 56 moved to the right in the above operation the point 79 also moved to the right thus tending to cancel the previous movement at 79 to the left and to bring the valve 63 to a mean settled position with the port 64 closed.

Again, assuming a steady running condition, if the supercharge pressure then fell the piston 72 of the servomotor comprising cylinder 73 would tend to move to the left, thus swinging the floating lever 68 about the pivot point 77 and causing the port 64 to be uncovered by movement of the valve 63 in a direction which will release liquid from the cylinder 57 and cause the pivot point 61 to move to the left by action of the spring 62 thus reducing the fuel injected by moving the rod 48 which operates the fuel pump rack to the left. An increase in supercharge air pressure or boost produces a converse effect and causes an increase in the fuel quantity injected.

Figure 5:
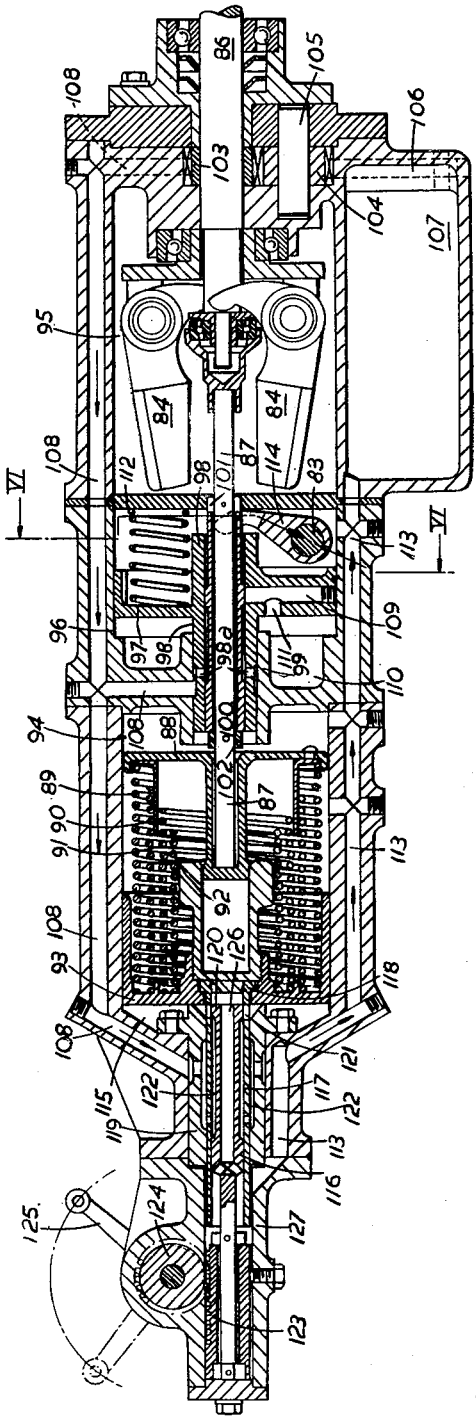
Figure 5 is a longitudinal sectional elevation of a variable speed centrifugal governor combined with a servomotor and suitable for use with each of the engines.

The centrifugal governor is shown in greater detail in Figures 5 and 6. The governor spindle 86 is driven by the engine and rotates weights 84 in the usual manner. In order that the weights 84 and the governor springs shall not be called upon to supply sufficient force to operate the control linkage and fuel pump rack, this governor is so arranged that the movements of the weights control only the value of a servomotor actuated by liquid pressure. The outward movement of the weights 84 are resisted by the governor springs through a push rod 87 which thrusts on a spring carrier 88. The other ends of four governor springs 89, 90, 91 and 92 rest against a movable piston-like abutment 93. Between a chamber 94 containing the springs and a chamber 95 containing the rotating weights there is a cylinder 96 with a piston 97 slidable within it. The piston 97 is mounted on a sleeve 98 in which are ports 98a and this sleeve slides within a cylindrical projection 99 in the end of the cylinder 96.

The piston 97 has in it a radial passage 109 leading from the bore of the sleeve 98 and communicating with a space 110 at one side of the piston 97 by a passage 111 through the face of the piston. It is to be understood that in normal working conditions the space 110 is filled with liquid. The piston 97 is urged towards the space 110 by three symmetrically disposed springs 112 shown in Figure 6. Surrounding the push rod 87 and sliding in the sleeve 98 is a piston valve 100. This valve is moved by the push rod 87 through collars 101 and 102 pinned to the rod. The bore of the valve 100 is larger than the diameter of the rod 87 and it is made free between the collars so that the valve can freely centre itself in the sleeve 98.

In the end of the chamber 95 is a gear pump having a gear wheel 103 driven by a spindle 86 and coacting with a follower wheel 104 mounted on a spindle 105. The pump draws liquid by a drilled passage 106 from a reservoir 107 and delivers the liquid under pressure to a passage 108, a relief valve, not shown, limiting the maximum pressure of the liquid.

The operation of the parts so far described is as follows: Assuming that the speed of the engine tends to rise then the weights 84 will tend to move outwards compressing the spring 89 and moving the valve 100 to the left thus uncovering the inner end of the passage 109 and allowing liquid to escape from the space 110 thus permitting the displacement of the piston 97 to the left under the load of the springs 112. The released liquid escapes to the right between the sleeve 98 and the valve 100 and returns to the reservoir 107 through the passage 113. The piston 97 will move to the left until the passage 109 is again covered by the valve 100 and the escape of liquid from space 110 is arrested. The piston 97 thus acts as a "slave" to the valve 100 and its movements will be in the same direction and to the same extent as the movements of the valve 100. The movements of the piston 97 are communicated to the transverse shaft 83 by a forked lever arm 114 which is on that shaft and whose end bears against the face of the piston sleeve 98 under the force of a spring (not shown). The shaft 83 carries the lever 82 (Figure 3) through which movement is transmitted to the rack of the fuel pump.

It will be observed that the four governor springs 89, 90, 91 and 92 are of different lengths. The springs engage between the abutment 93 and the spring carrier 88 in sequence in order to give the governor characteristic required. The diagram Figure 7 shows the approximate speed of the engine at which each of these springs comes into action. At idling speeds the spring 89 alone is in action. To increase the spring load on the governor and consequently to raise the governed running speed of the engine the abutment 93 is moved to the right. The movement of the abutment 93 is effected hydraulically, admission of liquid to the space 115 moves the abutment 93 to the right and release of liquid from the space 115 allows the governor springs to force the abutment 93 to the left.

The control of the flow of liquid into and out of the space 115 is effected by making the abutment piston member 93 act as a "slave" to a valve 116. The abutment piston member 93 carries a ported sleeve 117 held by a shoulder 118 in such a manner that the sleeve 117 can freely centre itself in a cylindrical guide 119 fixed in the end of the chamber 94. A land 120 of the valve 116 controls a port 121 in the sleeve 117. If the valve 116 is moved to the right the land 120 of the valve uncovers the port 121 and allows liquid to flow from the passage 108 via the annular passages 122 into the space 115 thus moving the piston 93 to the right. This movement of the piston also moves the sleeve 117 again to bring the port 121 fully over the land 120 to cut off the flow of liquid into the space 115. The piston 93 is now held in its new position until the valve 116 is moved to a new position either to the right to raise the speed setting or to the left to reduce it. The control of the valve 116 may be facilitated by employing a rack 123 engaging a pinion 124 rotated by a lever 125. When the valve 116 is moved to the left the land 120 uncovers the port 121 and liquid can escape from the space 115 through a bore 126 in valve 116, an annular clearance between the outside of sleeve 117 and a housing 127 within which it moves, and a passage 113 to the reservoir 107.

Figure 4:
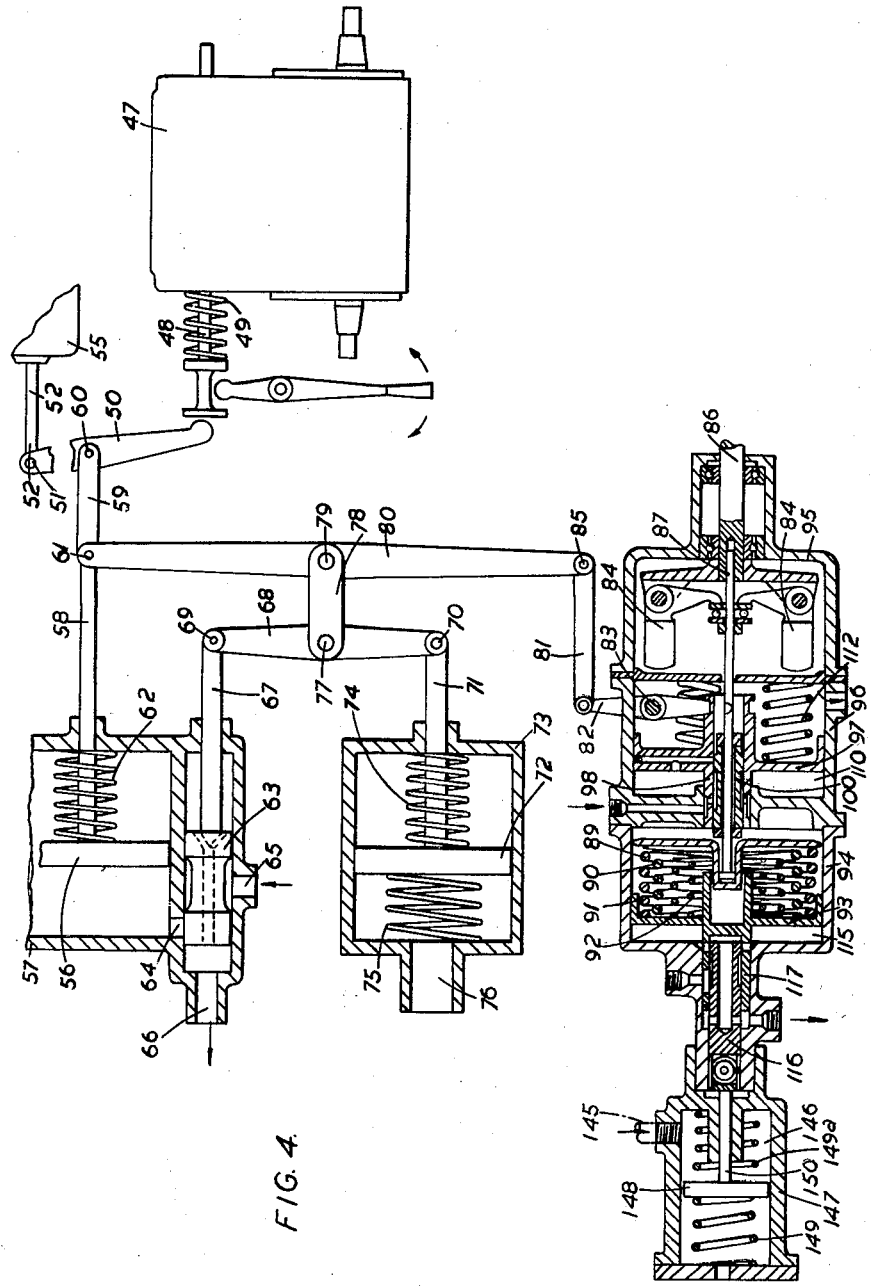
Figure 4 is a diagrammatic layout of the controls for each auxiliary engine which drives an air compressor.

In the case of the auxiliary engines 3 and 8 which drive the compressors the controls (see Figure 4) are similar to those shown in Figure 3 but with a modification in the method of controlling the valve 116. In the main engine controls shown in Figure 3 this valve is under the manual control of the driver. In the controls for the auxiliary compressor engines the valve 116 is controlled by the pressure of the air in the air pipe 4 (or 9) that is the boost pressure. A pipe 145 (see Figure 1) conveys the air pressure in the pipe 4 (or 9) to a space 146 in a cylinder 147 (see Figure 4). In this cylinder a piston 148 reciprocates, being loaded by a strong spring 149 on one side and by a light spring 149a and the boost pressure on the other. The movements of the piston 148 are communicated to the valve 116 by a rod 150. It will be seen that should the air pressure in the air system rise above the required pressure, thus indicating a supply of air in excess of requirements, the piston 148 will move to the left compressing the spring 149 and moving the valve 116 in a direction to reduce the load of the governor springs and consequently reduce the speed of the compressors thus reducing the air supply. The control mechanism for the auxiliary engine 3 is also shown simplified in Figure 1. Equivalent mechanism for the auxiliary engine 8 has been omitted so that the drawing shall not be unduly complex.

A power plant in accordance with the present invention as described above and as illustrated by the accompanying drawings as applied to the propulsion of a railway locomotive may be handled in the following way.

The governor valves 116 of the four main engines are set in the idling speed position by placing a master control lever 128 in the idling position. The lever 128 is connected to the valves 116 by suitable connections such as bell crank levers 129 and push-pull rods 130. The governors are indicated in Figure 1 by the symbol G on the four main engines and by H on the two auxiliary engines. To put the power plant into operation the procedure is to start the auxiliary engines 3 and 8 and allow them to run at idling speed in which condition air supplied by the compressors 2 and 7 in excess of that required by the supercharged auxiliary engines themselves will blow off at the loaded relief valves 6 and 11. The main engines are all started up and allowed to run at their idling speed.

To start the locomotive, the coupling liquid is allowed to flow into one of the fluid couplings for example into couplings 13 of engine "A" by manipulating the scoop control 21. As the coupling 13 fills the load on engine "A" increases which tends to slow this engine. The governor automatically gives this engine more and more fuel until this engine is developing full torque at idling speed and the locomotive is moving at low speed. As the speed of the locomotive approaches say 7 miles per hour the scoop control of one of the remaining engines, say for example control 22 of engine "B," is operated thus allowing the coupling 14 to fill which gradually puts this engine on full torque, and this procedure is repeated until all four engines are engaged. As soon as all four engines are on load, the speed of the locomotive can be controlled solely by the single control lever 128 by which the driver alters simultaneously the spring load on all the governors. At any given setting of the control lever 128, the governors maintain a constant main engine speed irrespective of normal changes of grade or wind.

It will be appreciated that so long as only one coupling for example 13 is allowed to fill, its associated engine "A" is operating the final drive shaft 42 with a velocity ratio represented by two differential gears in series. Assuming therefore that the differentials are such as to give a two to one ratio each, the velocity ratio when running on one engine is four to one. As the coupling 14 of the second engine fills the torque developed by engine "B" will increase until it overcomes the reverse torque on its sun wheel 27 which has been prevented from running backwards by its unidirectional brake device 44. When the sun wheel 27 commences to rotate in the same direction as the sun wheel 26 the velocity ratio falls to a value of two to one. Owing to the inherent flexibility of the fluid type coupling no shock occurs as the successive engines become engaged and contribute their torques to the final drive shaft 42. When three engines are engaged the velocity ratio for all the engines with respect to the shaft 42 is one and a third to one and when all four engines are engaged the ratio is one to one. In this latter condition the differential gearing is only called upon to equalise any discrepancy there may be between the torques developed by the several engines. It will be seen from the above description that no discontinuity can occur in the tractive effort as the engines are successively put on to load or taken off load and owing to the presence of the fluid couplings these operations can produce no shocks to the transmission system.

It is to be noted that if necessary the improved power plant may be arranged so that it will be possible to add the torques of two or more engines so that these will be operative simultaneously.

What I claim as my invention and desire to secure by Letters Patent is:

1. A power unit comprising in combination two main internal combustion engines each operating with compression ignition, means including at least one compressor driven independently of said main engines and serving to supercharge them, a plurality of engine speed responsive governors each of which controls the fuel injection pump of a main engine, means for varying the speed setting of each governor, a differential gear comprising two sun-wheels and a planet-carrying member, a plurality of variable filling fluid couplings connected to drive said sun-wheels, respectively, means connecting said main engines and variable filling fluid couplings, and control means for said variable fluid couplings whereby each of the said main engines may be selectively coupled and uncoupled to a sunwheel of the said differential gear, means for transmitting power from the planet-carrying member of the said gear to the mechanism which is to be driven by the power unit, and a unidirectional brake device operative on each sunwheel of the said differential gear to prevent reverse rotation of said sun wheel when its associated main engine is uncoupled, and means for selectively controlling the filling of each of said fluid couplings whereby said main engines can be coupled either singly or together to the mechanism to be driven.

2. A power unit embodying the features as set out in claim 1, in which each variable filling fluid coupling is of the scoop-controlled type.

3. A power unit embodying the features as set out in claim 1, in which each compressor is driven by an internal combustion engine operating with compression ignition and this engine has a governor with means for varying the speed setting thereof, the governor controlling the delivery of fuel to the said engine.

4. A power unit embodying the features as set out in claim 1 and including an internal combustion engine operating with compression ignition and driving each compressor, a governor of the centrifugal type controlling the delivery of fuel to this engine, a plurality of springs operative on the governor, means for varying the speed setting of the governor by movement of an abutment for the said springs, and means responsive to the boost pressure of a main engine for varying the speed setting of the governor by imparting movement to the said spring abutment.

5. A power unit embodying the features as set out in claim 1 and including an internal combustion engine operating with compression ignition and driving each compressor, a governor of the centrifugal type controlling the delivery of fuel to this engine, a plurality of springs operative on the said governor, a servomotor actuated by liquid under pressure and operative to vary the speed setting of the governor by movement of an abutment for the said springs, means for controlling the said servomotor in accordance with the boost pressure of the engine, and a servomotor actuated by liquid under pressure and operative to transmit from each governor the movement which effects the speed regulation of the engine with which the governor is associated.

6. A power unit embodying the features as set out in claim 1 wherein the sun-wheels of said differential gear carry brake drums and in which each of the said unidirectional brake devices is of the self-wrapping type operative on a brake drum carried by a a sun-wheel to grip said drum automatically and hold it stationary when the sun wheel and drum tend to rotate in one direction and to release said brake drum automatically when it is rotated in the opposite direction.

7. A power plant comprising in combination two power units each of which embodies the features set out in claim 1 and wherein the said planet-carrying member of the differential gear of each power unit is rotationally connected to the sun-wheel of a separate differential gear whose planet-carrying member is rotationally connected to the mechanism which is to be driven by the power plant.

8. A power unit embodying the features as set out in claim 1 and including in association with each main engine an automatic control system comprising means whereby the amount of fuel delivered by the fuel injection pump of the said main engine is varied in accordance with the speed of that engine and also in accordance with the boost pressure of the engine.

9. A power unit embodying the features as set out in claim 1 and including in combination an automatic control system associated with each main engine and comprising a governor responsive to variations in the speed of the engine and operative to control that speed, pneumatic means responsive to the boost pressure of the engine, and means actuated by said governor conjointly with said pneumatic means for varying the amount of fuel delivered to the main engine.

10. A power unit embodying the features as set out in claim 1 in which the main engines have air manifolds and including in combination an automatic control system associated with each main engine and comprising a governor responsive to variations in the speed of the engine and operative to control that speed, a servomotor including a cylinder with a piston therein, a port in the wall of the cylinder at one side of the piston with a communication between this port and the air manifolds of the engine, springs of different strengths respectively acting on each side of the said servomotor piston with the stronger spring at the side of the piston remote from the said port in the wall of the cylinder, means for varying the fuel supply to the engine in accordance with the movements responsive to boost pressure of the said servomotor piston, and means for also varying the amount of fuel delivered to the engine by operation of the governor.

11. A power unit embodying the features as set out in claim 1 in which the mechanism associated with each governor controlling an engine comprises in combination a casing enclosing the governor and its weights, a shaft through which the governor is rotated, a push rod coaxial with the said driving shaft and to which movement in the direction of the governor axis is imparted by the governor weights, a servomotor enclosed in the said casing and including a cylinder and piston therein concentric with the said push-rod, a valve controlling the flow of liquid under pressure to and from the cylinder of said servomotor the valve being concentric with the servomotor and actuated through the said push-rod by the governor weights, means by which movements of the piston of the said servomotor are caused to adjust the rack of the fuel pump of the engine and vary the fuel supply to the engine, at least one spring acting on the governor weights, and hydraulic means for moving an abutment of said spring and thereby varying the setting and operation of the governor.

12. A power unit embodying the features as set out in claim 1 in which the control of the fuel supply to each engine is effected automatically by apparatus which includes a fuel supply pump having a rack and a servomotor actuated by liquid under pressure and operative to set the rack of the fuel supply pump, a piston valve controlling the servomotor, means for actuating the said valve in accordance with the speed of the engine, and means for also actuating the said valve in accordance with the boost pressure of the engine.

13. A power unit embodying the features as set out in claim 1 in which the control of each engine is effected by hydraulic means utilising oil under pressure obtained from the lubricating system of the engine and including fluid pressure responsive means connected to the fuel injection pump control whereby if the pressure in the said system falls below a predetermined figure the automatic control of the fuel supply can be overridden and the delivery of fuel by the fuel pump stopped.

14. A power unit embodying the features as set out in claim 1, including a safety control means for stopping the delivery of fuel by the fuel pump of each main engine, hydraulic means utilizing oil under pressure obtained from the lubricating system of said main engine for maintaining said safety control means in an inoperative position when said pressure exceeds a predetermined value, and means for moving said safety control means into an operative position when said pressure falls below said predetermined value.

15. A power unit comprising in combination two internal combustion engines each operating with compression ignition, a fuel injection pump for each engine, a compressor driven independently of said engines and connected thereto to supercharge them, a plurality of engine speed responsive governors each of which controls the fuel injection pump of one of said engines, selective means for varying the speed setting of said governors, a differential gear comprising two sunwheels and a planet-carrying member, a variable filling fluid coupling connected to drive each sunwheel and individual control means for said fluid couplings connecting said engines respectively to said couplings whereby each of said engines may be selectively coupled and uncoupled to its corresponding sunwheel, means for transmitting power from said planet-carrying member to the mechanism to be driven by said power unit, and a unidirectional brake device operative on each sunwheel to prevent reverse rotation thereof when uncoupled from an engine, whereby said power unit operates to transmit the torque of either or both engines to said driven mechanism progressively and uniformly during coupling and uncoupling thereof at all running speeds.

LOUIS FREDERICK RUDSTON FELL.

REFERENCES CITED

The following references are of record in the file of this patent:

UNITED STATES PATENTS

| Number | Name | Date |
|---|---|---|
| 1,076,632 | Gammeter | Oct. 21, 1913 |
| 1,315,962 | Hussander | Sept. 16, 1919 |
| 1,710,962 | Banner | Apr. 30, 1929 |
| 1,868,130 | Bauer et al. | July 19, 1932 |
| 1,953,486 | Kiep | Apr. 3, 1934 |
| 2,180,108 | Heinzelmann | Nov. 14, 1939 |
| 2,263,202 | Wood | Nov. 18, 1941 |
| 2,283,431 | Gasser | May 19, 1942 |
| 2,300,977 | Schlaepfer | Nov. 3, 1942 |
| 2,403,398 | Reggio | July 2, 1946 |